United States Patent [19]

Kuchuk-Yatsenko et al.

[11] Patent Number: 4,999,476
[45] Date of Patent: Mar. 12, 1991

[54] MACHINE FOR PRESSURE WELDING WORKPIECES HEATED WITH ARC MOVING IN MAGNETIC FIELD

[75] Inventors: Sergei I. Kuchuk-Yatsenko; Valery G. Krivenko; Petr V. Kuznetsov; Vladimir J. Bogatyrev; Sergei I. Golovchenko; Vadim J. Ignatenko, all of Kiev, U.S.S.R.

[73] Assignee: Institut Elektrosvarki Imeni E. O. Patona Akademii Nauk USSR, Kiev, U.S.S.R.

[21] Appl. No.: 459,743
[22] PCT Filed: Jun. 15, 1989
[86] PCT No.: PCT/SU89/00162
§ 371 Date: Feb. 20, 1990
§ 102(e) Date: Feb. 20, 1990
[87] PCT Pub. No.: WO89/12524
PCT Pub. Date: Dec. 28, 1989

[30] Foreign Application Priority Data

Jun. 20, 1988 [SU] U.S.S.R. ............................ 4473982

[51] Int. Cl.$^5$ .............................................. B23K 11/04
[52] U.S. Cl. ........................................ 219/97; 219/123
[58] Field of Search ......................... 219/123, 97, 100

[56] References Cited

U.S. PATENT DOCUMENTS 3,937,916 2/1976 Sciaky .
4,052,585 10/1977 Sidyakin et al. .

FOREIGN PATENT DOCUMENTS 1207684 1/1986 U.S.S.R. .
1109598 10/1968 United Kingdom .

OTHER PUBLICATIONS

Magnet-Schweissen Process Advertised by Kuko Co. of FRG.
Advertised by Kuko Co. of FRG. MBL Schweisetechnik Gerate, Vorrichturtgen Anwendungsbeispiele, N. 126, S-7.

Primary Examiner—Clifford C. Shaw
Attorney, Agent, or Firm—Lilling and Lilling

[57] ABSTRACT

The machine incorporates two clamping means, a static one fitted to a bedframe and a movable one mounted on rods which are attached to upsetting hydraulic cylinders with their ends with provision for reciprocating back and forth. Each clamping means consists of a base and a holding-down plate which is hinged to the base and displaced by a hydraulic cylinder a body of which is hinged to the base and a piston rod of which is hinged to the holding-down plate interacting with a holding down roller in clamping workpieces. The machine is provided with a fastener in the form of an inverted L-shaped lever, a means of adjusting the alignment of the workpieces for welding, and a means of setting a gap between the workpieces, made as a plunger and an adjustable stop installed coaxially.

3 Claims, 3 Drawing Sheets

MACHINE FOR PRESSURE WELDING WORKPIECES HEATED WITH ARC MOVING IN MAGNETIC FIELD

BACKGROUND OF THE INVENTION

1. Field of the Invention

The present invention relates to pressure welders and has specific reference to a machine for pressure welding workpieces with an arc moving in a magnetic field.

2. Description of the Related Art

An invariably high quality of the welded joint combined with a high process productivity is a specific problem encountered in joining small-diameter pipes which cannot be revolved during the welding operation as this is the case in laying pipelines. At present, small-diameter pipes are joined mostly by manual welding, using coated electrodes or gas shields. The quality of the welded joint greatly depends in this case on the welder's skill, quality of the material and the conditions of welding.

To eliminate the disadvantages inherent in manual arc welding, microprocessor-controlled orbital welders are sometimes employed. They quickly produce quality welds but add to the cost of the equipment, need skilled attendants and impose limitations on the environmental conditions (temperature, humidity and dust content of the atmosphere).

Small-diameter pipes and workpieces of intricate shape and small size are joined by welding machines employing an arc displacing in a magnetic field. The weld quality is high in this case but the machine itself is bulky and can be used in the shop only.

So, widely known is a pressure arc welder the arc whereof revolves in a magnetic field (Magnetschweissen process advertised by KUKA Co. of FRG). The welder is designed for operation in the shop. It has a bedframe with clamping means of the chuck type which are mounted on guides and actuated by upsetting hydraulic cylinders. The bedframe gives support to hydraulic pumps, controls, positioners for loading and unloading the workpieces automatically and other equipment.

This machine is designed for specific applications such as, e.g. the fabrication of cardan shafts, clamps and other parts of intricate shape.

Also known in the art is a pressure welder with the arc revolving in a magnetic field (MBL—Schweistechnik Geräte, Vorrichtungen. Anwendungsbeispiele, N. 126, S. 7) which has two clamping means, a static one and a mobile one displacing in the axial direction, supported on a bedframe by guides. Each clamping means is provided in the form of two contact jaws one of which can displace radially for loading and unloading the workpieces.

Being installed in the shop, this machine can weld both long and small pieces. But its dimensions prevent field application.

Suitable for field application is a known pressure welder the arc whereof for heating the workpieces displaces in a magnetic field (SU; A; No. 1,207,684). The welder incorporates two clamping means for holding fast the workpieces which each have a holding-down plate hinged to a base and fitted with a means of displacing relative thereto and a clamping hydraulic cylinder a body of which is fitted to the base and a piston rod of which is hinged to tierods attached whereto is a holding-down roller located, on a side of the holding-down plate opposite to that where the hinged joint between the holding-down plate and the base is found, so as to interact with the holding-down plate in clamping the workpieces before welding; two upsetting hydraulic cylinders attached to a base of the static first clamping means whereas the second clamping means is mounted with its base on rods attached to the upsetting hydraulic cylinders at their ends with provision for reciprocating back and forth; and two means of setting a gap between the end faces of the workpieces which are movably linked to the upsetting hydraulic cylinders.

The rods mounted whereon as the second clamping means are cantilevers which deprive the structure of adequate stiffness. Significant tensile loads coming into play when long pieces are being welded bring about misalignment of the workpieces held fast in the clamping means. Therefore, the welded joint may not meet the specified requirements.

In the known machine each means of displacing the holding-down plate relative to the base consists of a handle, attached to the holding-down roller, and a first pulley linked by a cable to a second pulley which is fitted to the holding-down plate at the hinged joint thereof with the base. The holding-down plate is raised and lowered by the attendant who sets the holding-down roller into motion integrally with the tierods by operating the handle so that the first pulley revolves, winding or unwinding the cable.

This is a tiresome and inefficient job, and the cable interconnecting the two pulleys gets rapidly damaged so that the machine must be shut down for repair.

Each means of setting up a gap between the end faces of the workpieces being welded in the machine is essentially an adjustable stop and a spring-loaded sleeve which is operatively connected with the piston rod of the hydraulic cylinder and interacts with the body.

For setting up a gap between the ends of the workpieces to be joined by welding, fluid is fed under low pressure into the piston-rod end of the upsetting cylinder so that the piston displaces until the spring-loaded sleeve comes abutting against the cylinder body. Next, fluid is admitted into the same cylinder end under high pressure, causing the piston to displace further so as to compress the spring and shift the second clamping means into an appropriate position in which the piston rod comes abutting against the adjustable stop controlling the gap between the workpieces.

However, this arrangement fails to maintain an accurate gap between the end faces of the workpieces, for the pressure the piston is exposed to depends on the fluid pressure and this may vary in operation. An alteration of the gap may lead to a short circuit or may extinguish the arc moving therein. This has an adverse effect on weld quality.

SUMMARY OF THE INVENTION

It is an object of the present invention to provide a machine for pressure welding workpieces heated up with an arc moving in a magnetic field having such a structural arrangement of a means of displacing the holding-down plate relative to the base and a means of setting a gap between the end faces of the workpieces being welded, as well as stiff structure and additional mechanisms incorporated therein, which would ensure high-quality welded joints, increase the output of the machine, and reduce the labor required to attend to it.

This object is realized by a machine for pressure welding workpieces heated up with an arc moving in a magnetic field. The machine incorporates two clamping means holding fast the workpieces to be welded and each having a holding-down plate, which is hinged to a base and fitted with a means for being displaced relative to the base, and a clamping hydraulic cylinder, a body of which is mounted on the base and a piston rod of which is hinged to tierods attached whereto there is a holding-down roller which interacts with the holding-down plate in clamping the workpiece, being located on a side of the holding-down plate opposite to that where its hinged joint with the base is found; two upsetting hydraulic cylinders attached to the base of the first clamping means which is mounted immovably whereas the second clamping means is mounted with its base on rods attached with their ends to the upsetting hydraulic cylinders with provision for reciprocating back and forth; and two means of setting a gap between the end faces of the workpieces, which are movably linked to the upsetting hydraulic cylinders. According to the invention the machine further incorporates a bedframe at one end of which is located the base of the first clamping means and at the opposite end of which are located the other ends of the rods, two fasteners each in the form of an inverted L-shaped lever hinged to the base of either the first or the second clamping means at the side opposite to that where the hinged joint with the holding down plate is found so as to interact with the holding down roller with one of its ends and with the holding-down plate with the other end, whereby each means of displacing the holding-down plate relative to the base is provided in the form of a hydraulic cylinder a body of which is hinged to the base and a piston rod whereof is hinged to the holding-down plate at the side of the hinged joint thereof with the base, and each means of setting a gap between the end faces of the workpieces is provided in the form of a plunger, fitted to the bedframe at the side where the other ends of the rods are located—and an adjustable stop fitted to the base of the second clamping means in alignment with the plunger.

It is expedient that the machine incorporates a means of adjusting the workpieces for alignment which is located on the base of the seconc clamping means.

It is also expedient that the rod located in the base at the side thereof which is opposite to that where the hinged joint with the holding-down plate is found fits into the base with a clearance and a drilling is provided in the rod, and that the means of adjusting the workpieces for alignment consists of a tierod connected to the base through a threaded joint at one end and fitting into the drilling of the rod with the other end, being held fast thereto.

The disclosed machine for pressure welding workpieces heated with an arc moving in a magnetic field has a stiff structure which prevents misalignment of the workpieces and ensures high-quality welds. If the workpieces are of different transverse dimensions, they can be adjusted for alignment so as to obtain a weld of the same superb quality and practically eliminate rejects.

The machine maintains a constant gap between the workpieces which are being welded, which is a factor contributing to high weld quality.

The machine can be used both in the shop and in the field. The operation of clamping the workpieces is automated, and the hard physical effort is taken out of the process so that it gains in productivity.

BRIEF DESCRIPTION OF THE DRAWINGS

A preferred embodiment of the invention will now be described by way of example with reference to the accompanying drawings, wherein.

DESCRIPTION OF THE PREFERRED EMBODIMENT

Figure 1:
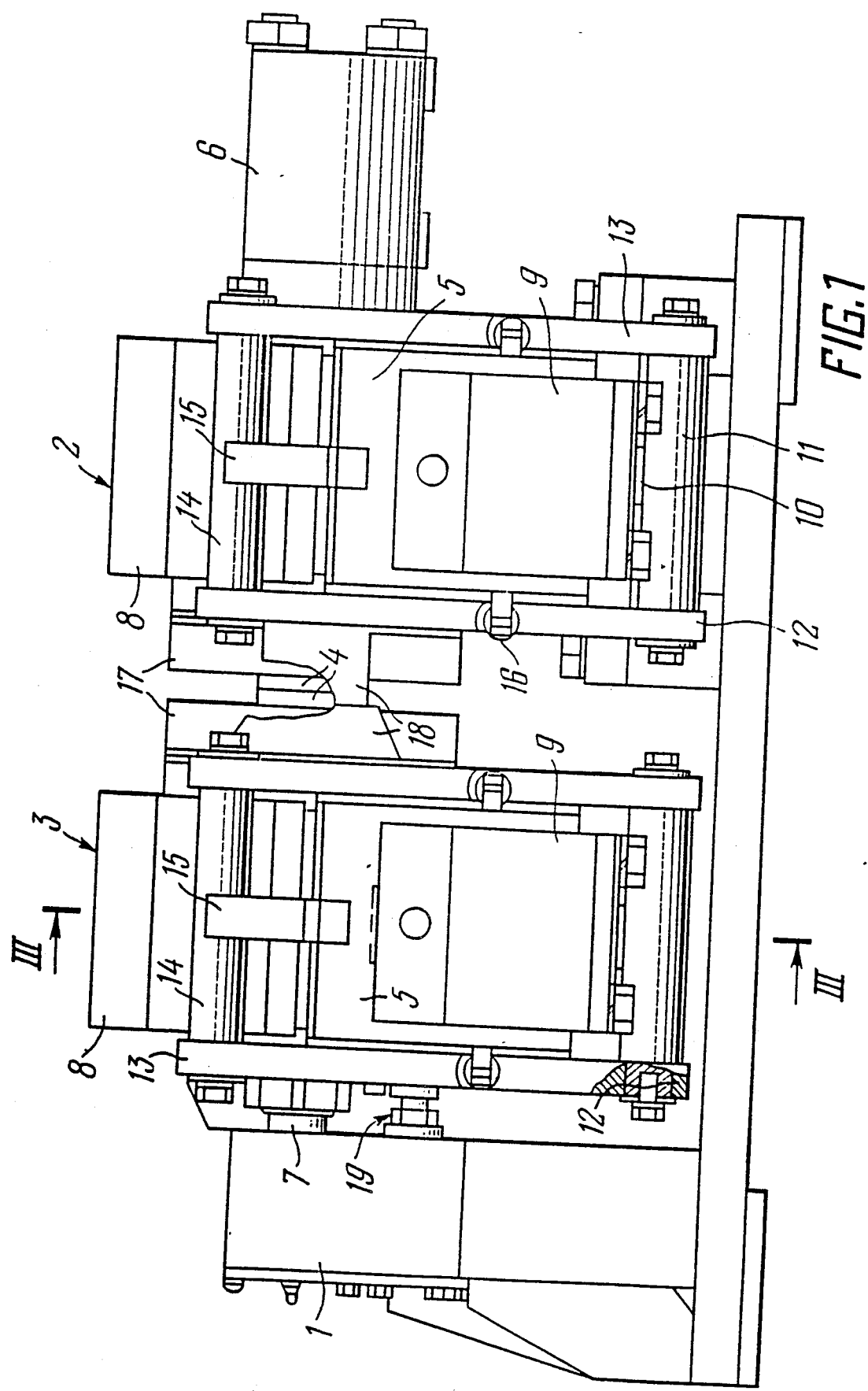
FIG. 1 is a general view of the machine for pressure welding workpieces heated with an arc moving in a magnetic field according to the invention.

Referring to FIG. 1, the machine for pressure welding workpieces heated with an arc moving in a magnetic field incorporates a bedframe 1, two clamping means 2, 3 for holding fast workpieces 4 to be welded and a base 5 of the first clamping means which is fixed to the bedframe 1.

The base 5 carries two upsetting hydraulic cylinders 6 attached thereto, each with an end. There are two rods 7 mounted whereon is a base 5 of the second clamping means 3. The other ends of the rods 7 are secured in grooves of the bedframe 1 at the opposite end thereof. These features of the design, integrating the clamping means 2, 3 and the rods 7 with the bedframe 1, stiffen the machine so that the workpieces 4 are always kept in alignment, even when they are long.

Each clamping means 2, 3 has a holding-down plate 8 hinged to the base 5, and a clamping hydraulic cylinder 9 is fitted into the base 5. A piston rod 10 of the hydraulic cylinder 9 carries a bar 11 which is linked to tierods 13 through a hinge 12, and the tierods 13 are connected to a holding-down roller 14. A fastener 15 in the form of an inverted L-shaped lever is fitted to each base 5, and the tierods 13 are linked to the base 5 by springs 16. Magnets 17 (permanent ones or electromagnets) are fitted to the clamping means 2, 3 next to the end faces of the workpieces 4.

Guards 18 are fitted to the bases 5 of the clamping means 2, 3 at the end faces of the workpieces 4 to protect the rods 7 against sparks formed in the course of welding.

The machine also incorporates two means 19 for setting a gap between the end faces of the workpieces which are movably linked to upsetting hydraulic cylinders 6.

The machine is illustrated in a position preparatory to the process of welding.

Figure 2:
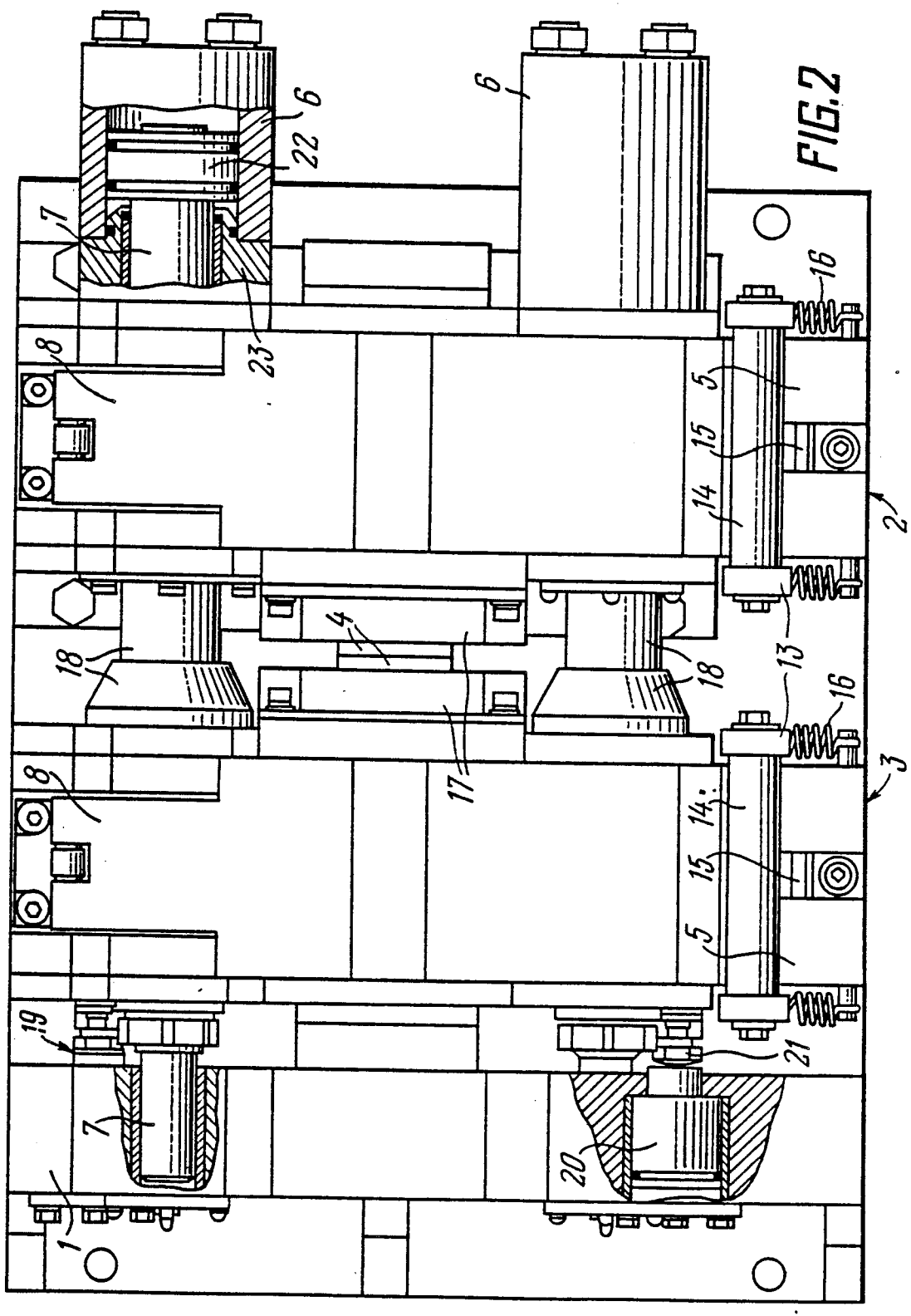
FIG. 2 is a plan view of the machine according to the invention shown in FIG. 1, with an upsetting hydraulic cylinder and the bedframe at the locality of the rod ends and plunger shown partly cut away.

Referring to FIG. 2, each means 19 for setting a gap between the workpieces 4 consists of a plunger 20, fitting into a boring of the bedframe 1 at the side thereof where the other ends of the rods are found—and an ajustable stop 21 in the form of a screw with a spherical head which interacts with the plunger 20, being placed in alignment therewith. The threaded portion of the screw is screwed into the base 5 of the clamping means 3. The means 19 of setting a gap between the workpieces 4 is connected to a piston 22 of the upsetting hydraulic cylinder 6 by an rod 7 which functions as the piston rod.

Each upsetting hydraulic cylinder 6 has an end plate 23 at the piston-rod end.

Figure 3:
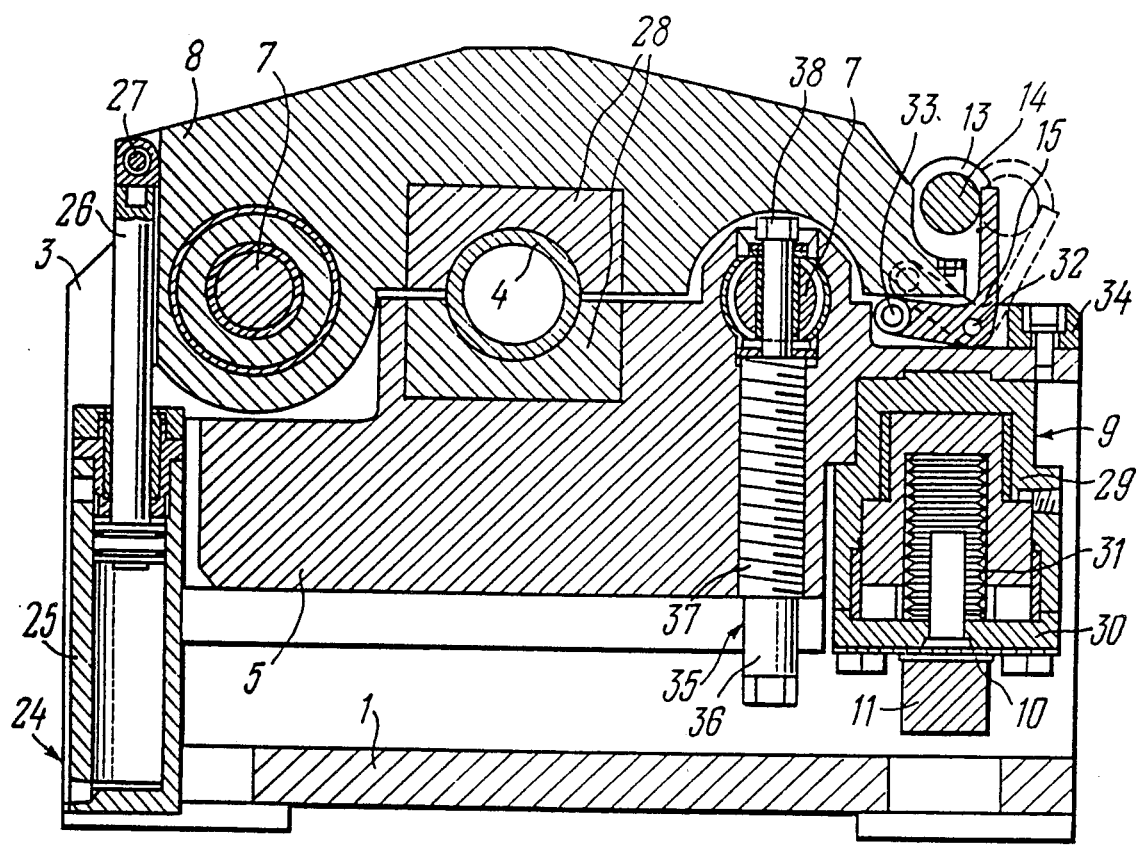
FIG. 3 is a section on line III—III of FIG. 1 according to the invention.

Referring to FIG. 3, each clamping means 2, 3 has a means 24 of displacing the holding-down plate relative to the base which is a hydraulic cylinder a body 25 of which is hinged to the base 5 and a piston rod 26 whereof is linked to the holding-down plate 8, at the side thereof where the hinged joint with the base 5 is found, through a hinge 27 the axis whereof is in alignment with that of one of the rods 7.

A pair of replaceable contact jaws 28 which are in direct contact with the workpieces 4 are provided in the holding-down plate 8 and the base 5 adjacent to each other. They can be replaced by another pair suiting the outside diameter of the workpieces 4.

In the preferred embodiment of the invention, the clamping hydraulic cylinders 9 are of the plunger, each having a body 29 which fits into the base 5 of each of the clamping means 2, 3. An end plate 30, a disk spring 31 and a piston rod 10 are installed in the body 29.

Each base 5 of the clamping means 2, 3 is provided with a fastener 15 in the form of an inverted L-shaped lever which is attached by a hinge 32 at the side which is opposite to that where the hinged joint of the base 5 with the holding-down plate 8 is found. At one end of each inverted L-shaped lever there is provided a roll 33 which is set into contact with a projection of the holding-down plate 8 when this is being lowered. The other end of the lever interacts with the holding-down roller 14. The fastener 15 is released in raising and lowering the holding-down plate 8, being set so as to abut against a stop 34 in the base 5 as shown by dash lines in FIG. 3.

The machine is provided with a means 35 of adjusting the alignment of the workpieces 4 for welding which consists of a tierod 36 which passes through a drilling in the rod 7, passing through the base 5 at the side opposite to that where the hinged joint of the holding-down plate 8 with the base 5 is found, and is attached to the base with a thread 37 at an end. The other end of the tierod 36 with a reduced cross-sectional area is held fast to the same rod 7 with a nut 38. The rod 7 is provided with a drilling fitted whereto is a tierod 36.

A clearance existing between the rod 7 and the base 5 enables the base 5 to displace with respect to the opposite rod 7.

A source of welding current, a hydraulic pump and a control system can be located externally to the machine and are not shown in the drawings.

The machine for pressure welding workpieces heated with an arc moving in a magnetic field operates as follows.

An initial position before the welding process is one in which the corresponding upsetting hydraulic cylinder 6 (FIG. 1) sets the clamping means 3, which is mounted on the rods 7, so that the adjustable stops 21 (FIG. 2) provided on the base 5 (FIG. 1) of the clamping means 3 come abutting against the plungers 20 (FIG. 2). The holding-down roller 14 (FIG. 3) of each clamping means 2, 3 depresses the holding-down plate 8 between which and the base 5 there are located the contact jaws 28 clamping the workpieces 4.

To set the machine into the initial position, fluid is admitted under a pressure into both ends (piston-rod and head) of the upsetting hydraulic cylinders 6 (FIG. 2). The piston 22 of each hydraulic cylinder 6 displaces towards the end plate 23 so that the rods 7 displace integrally with the clamping means 3 attached thereto until the adjustable stops 21 of the base 5 of the clamping means 3 come abutting against the plungers 20.

In operation, the plungers 20 are constantly under a fluid pressure. The force produced by the upsetting hydraulic cylinder 6 due to a difference between the pressure in the piston-rod end and that in the head end is less than the force set up by the plunger 20. A clearance existing between each end plate 23 and the piston 22 of the corresponding hydraulic cylinder 6 can be altered by taking up or backing off the adjustable stop 21.

The workpieces 4 are placed between the contact jaws 28 (FIG. 3), using a means of loading (not shown), so that they are in alignment with each other and their end faces contact each other between the magnets 17 (FIGS. 1 and 2). When fluid is admitted into the head end of the hydraulic cylinder of the means 24 (FIG. 3) of displacing the holding-down plate relative to the base, the piston rod 26 linked to the holding-down plate 8 through the hinge 27 lowers the holding-down plate until the replaceable contact jaws 28 clamp the workpieces 4. The holding-down plate 8 depresses the roll 33 together with an end of the inverted L-shaped lever which, being located in an extreme position due to contact with the stop 34, turns about the hinge 32 so that the opposite end of the lever sets the holding-down roller 14 in a position preceding the clamping of the workpieces 4 (shown in solid line).

The raising and lowering of the holding-down plate 8 by the means 24 provided in the form of the hydraulic cylinder and also the setting of the holding-down roller 14 into the position preceding the clamping of the workpieces as well as the reversing of this position which are the functions of the inverted L-shaped lever are all automatic operations which are carried out due to feeding fluid into the piston-rod end and the head end of the hydraulic cylinder. This eliminates the tiresome manual effort and increases the output of the machine.

As fluid is admitted into the clamping hydraulic cylinder 9, its piston rod 10 displaces, compressing the spring 31 and setting the holding-down roller 14 in contact with the holding-down plate 8 through the agency of the tierods 13 and the bar 11 pivoting about the hinge 12.

At this stage, the workpieces 4 to be welded are aligned and clamped in the clamping means 2, 3 and the machine carries on with the welding, a voltage being applied, to that end, to the clamping means 2, 3 from a source of welding current. The rod-ends of the upsetting hydraulic cylinders 6 are relieved of the pressure. As a result, the force exerted by the upsetting hydraulic cylinders 6 exceeds the force set up by the plungers 20 so that the pistons 22 of the upsetting hydraulic cylinders 6 displace and come abutting against the end plates 23, taking up the existing clearance. This clearance is set once for the workpieces 4 of the same size. Accordingly, the rods 7 displace as well integrally with the clamping means 3 which holds fast one of the workpieces 4. The contacting workpieces 4 are set apart and a gap is formed therebetween where an electric arc is being struck.

The design features of the means 19 guarantee that a stable gap is set up between the end faces of the workpieces 4. At the same time, the magnets 17 (FIGS. 1, 2) induce a magnetic field which interacts with the current and causes the arc to travel around the perimeter of the end faces of the workpieces 4 until they heat up to the temperature of plastic deformation.

After some interval of time, a current pulse of increased strength brings about melting of the end faces of the workpieces 4.

For the upsetting operation, fluid is admitted into the piston-rod ends of the upsetting hydraulic cylinders 6 while the pressure in the head ends of these cylinders is thrown off. As a result, the rods 7 displace integrally with the clamping means 3 and one of the workpieces 4 through a distance exceeding the gap between the workpieces. This gives enough room for the workpieces 4 to interact with each other and plastically deform so as to form a welded joint.

The workpieces 4 are kept in this position during a certain period of time, during which the source of welding current is turned off, before being released.

To that end, the clamping hydraulic cylinder 9 (FIG. 3) is relieved of pressure. The spring 31 expands and causes the piston rod 10 of the hydraulic cylinder 9 to come abutting against the body 29. The holding-down roller 14 is returned into the position, which preceded the clamping operation, due to the action of the tierods 13 and the arm 11.

As fluid is admitted into the piston-rod end of the hydraulic cylinder of the means 24 for displacing the holding-down plate, the piston rod 26 lifts the holding-down plate 8, being hinged thereto. One end of the inverted L-shaped lever is released while the other end interacts with the holding-down roller 14. As a result, the inverted L-shaped lever (FIG. 3) contacts the stop 34, which limits its travel, when the tierods 13 connected by the springs 16 (FIG. 2) to the base 5 of the clamping means 2, 3 set the holding down roller 14 into an appropriate position.

The welded together workpieces 4 are unloaded from the clamping means 2, 3 and the machine is ready for the next welding cycle.

A misalignment of the workpieces 4 when they are fitted into the clamping means 2, 3 before welding, which may result from difference in shape or tolerance on dimensions, can be eliminated with the aid of the means 35.

When the tierod 36 of the means 35 of adjusting the workpieces 4 for alignment is being revolved, the base 5 of the clamping means 3 displaces with respect to the rod 7, fixed wherein is the tierod 36, and the clearance between the base 5 and the rod 7 is taken up. The appropriate workpiece 4 also displaces integrally with the base 5 of the clamping means 3 relative to the other rod 7 over an arc of a circle. Since the radius of this circle is large, this displacement can be regarded as a linear correction of the alignment of the workpieces 4 which provides for improving the quality of the welded joint between the workpieces 4 of different cross-sectional areas.

Operating in this way, the disclosed machine produces high-quality welds, has a high output and can be employed both in the shop and in the field for welding various workpieces, long ones included.

INDUSTRIAL APPLICABILITY

The present invention may be of utility in various branches of mechanical engineering for joining pieces of hollow continuous-contour stock. It may also find application in the field for laying pipelines and fabricating structural members. It is expedient to employ the present invention in automotive engineering to produce cardan shafts, torque rods, muffler pipes and in boiler engineering for making steam lines.

We claim:

1. In a machine for pressure welding workpieces heated with an arc moving in a magnetic field, a device comprising a first and a second clamping means holding fast the workpieces and each having a holding-down plate, which is hinged to a base at one side and fitted with a means for being displaced relative to the base, and a clamping hydraulic cylinder having a body mounted on the base and a piston rod hinged to tierods, holding-down rollers attached to the tierods, which interact with the holding-down plate in clamping the workpieces, the holding-down rollers being located on a side of the holding-down plate opposite to the side hinged to the base; two upsetting hydraulic cylinders attached to the base of the first clamping means which is mounted immovably, the second clamping means being mounted with its base on rods attached with their first ends to the upsetting hydraulic cylinders so that the second clamping means can reciprocate towards and away from the first clamping means; and two means of setting a gap between end faces of the workpieces, which are movably linked to the upsetting hydraulic cylinders, said device further comprising a bedframe at one end of which is located the base of the first clamping means and at an opposite end of which are located second ends of the rods, two fasteners each in the form of an inverted L-shaped lever having two ends hinged to the base of either the first or the second clamping means at the side opposite to the side hinged to the base so as to interact with the holding down rollers with one of its ends and with the holding down plate with the other end, whereby each means of displacing the holding-down plate relative to the base is provided in the form of a hydraulic cylinder having a body hinged to the base and a piston rod hinged to the holding-down plate at the side of the hinged joint thereof with the base and each means of setting a gap between the end faces of the workpieces is provided in the form of a plunger fitted to the bedframe at the side where the other ends of the rods are located, and an adjustable stop fitted to the base of the second clamping means in alignment with the plunger.

2. In a machine as claimed in claim 1, said device further comprising a means of adjusting the alignment of the workpieces for welding, the means being located in the base of the second clamping means.

3. In a machine as claimed in claim 2, said device wherein one of the rods, located in the base at the side opposite to the side hinged to the base, fits into the base with a clearance and has a drilling, whereby the means of adjusting the alignment of the workpieces for welding comprises a tierod having a first end with a thread serving to connect the tierod to the base and a second end fitting into the drilling in the rod to which said tierod is made fast.

* * * * *